United States Patent [19]

Fujita

[11] Patent Number: 4,679,941
[45] Date of Patent: Jul. 14, 1987

[54] MICRO-DIMENSIONAL MEASUREMENT APPARATUS

[75] Inventor: Hiroo Fujita, Tanashi, Japan

[73] Assignee: Citizen Watch Co., Ltd., Tokyo, Japan

[21] Appl. No.: 650,335

[22] Filed: Sep. 13, 1984

[30] Foreign Application Priority Data

Sep. 16, 1983 [JP] Japan .................. 58-170762
Apr. 20, 1984 [JP] Japan .................. 59-079772

[51] Int. Cl.⁴ .............................................. G01B 11/02
[52] U.S. Cl. .................................... 356/384; 356/387
[58] Field of Search ................. 350/358; 356/384, 387

[56] References Cited

U.S. PATENT DOCUMENTS

| | | | |
|---|---|---|---|
| 3,055,258 | 9/1962 | Hurvitz .............................. | 350/358 |
| 3,485,559 | 12/1969 | Maria .................................. | 350/358 |
| 3,565,532 | 6/1971 | Heitmann et al. ................. | 356/375 |
| 3,644,742 | 2/1972 | Brienza ............................... | 350/358 |
| 4,499,383 | 2/1985 | Loose .................................. | 356/384 |

Primary Examiner—R. A. Rosenberger
Assistant Examiner—Crystal D. Cooper
Attorney, Agent, or Firm—Jordan and Hamburg

[57] ABSTRACT

A micro-dimensional measurement apparatus for precise non-contact measurement of distances between edges formed upon a surface, basically comprising an acousto-optical element for scanning a light beam across the surface with the scanning distance varying in accordance with a deflection voltage, a photo-sensor for sensing the intensity of resultant light reflected from the surface, and a data-processing circuits for determining when the rate of change of the reflected light intensity reaches maximum values, corresponding to positions of surface edges, and for measuring the distance between a pair of edges on the surface based upon a change in the deflection voltage occurring between the corresponding two maximum values.

5 Claims, 12 Drawing Figures

MICRO-DIMENSIONAL MEASUREMENT APPARATUS

BACKGROUND OF THE DISCLOSURE

In recent years, there has been an everincreasing amount of manufacturing to a very high degree of dimensional precision. As a result, there is an urgent need for simple non-contact means for measuring minute values of dimensions with high accuracy, which can be put to practical use in an actual manufacturing environment rather than in the controlled environment of a laboratory. Such dimensional measurement is primarily concerned with the measurement of distances between edges upon a surface of an object, e.g. outer edges of a surface or the edges of raised or recessed portions of a surface.

Figure 1:
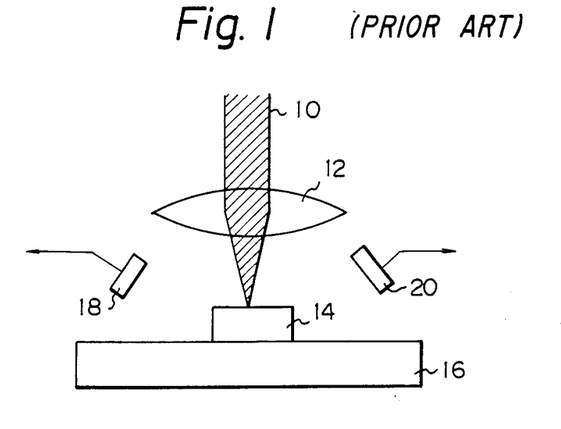
FIG. 1 is a simplified diagram to illustrate the basic principles of a micro-dimensional measurement apparatus for measuring distances between edges according to the prior art.

One method which has been proposed in the prior art to accomplish this is to direct a beam of light onto the surface concerned, and to arrange one or more photo-sensors such as to detect the intensity of the resultant light reflected from the surface. The body under measurement is mounted upon a movable stage, e.g. movable in an X-Y manner, for example as shown in FIG. 1 of the drawings in which a body 14 is mounted on a movable stage 16, with a beam of light 10 being focussed to form a small spot on the upper face of body 14 by a lens 12. Photo-sensors 18 and 20 are disposed with respect to the position of incidence of the light beam 10 such as to receive reflected light from the surface. With such an arrangement, the intensity of reflected light sensed by sensors 18, 20 is a minimum when light beam 10 falls upon a portion of the surface of body 14 which is flat and aligned perpendicular to the direction of incidence of light beam 10, while the intensity of the sensed reflected light is a maximum when the light beam 10 is incident upon a portion of the surface of body 14 which is substantially inclined with respect to the direction of incidence of light beam 10, i.e. at an edge of object 14. In this way, the position of an edge can be detected as a change in the intensity of the reflected light sensed by sensors 18, 20 as body 14 is moved with respect to light beam 10. However such an arrangement has various fundamental disadvantages. Firstly, it is necessary to position the photo-sensors very precisely with respect to the position of incidence of light beam 10 on object 14. Secondly, the method is based upon changes in the absolute magnitude of the reflected light, which will of course vary considerably between an edge portion which is relatively shallow and one which is relatively deep. Thirdly, due to the use of mechanical movement of the body under measurement, in order to scan light beam 10 over the body surface, irregularities of movement of the body will produced corresponding errors of measurement, so that such a method cannot be used for measurement of dimensions to a very high degree of accuracy.

There is therefore a requirement for a non-contact form of apparatus for measuring minute distances between edges of a surface on an object which will overcome the disadvantages of the prior art as described above, yet which will be simple and practical. Such an apparatus is disclosed by the present invention.

SUMMARY OF THE INVENTION

A micro-dimensional measurement apparatus according to the present invention differs from the prior art apparatus described above in that a light beam is scanned over the body surface under measurement by electrically controlled deflection means, with the body being held fixed in position. Furthermore, a micro-dimensional measurement apparatus according to the present invention performs detection of edges by processing the values of intensity of reflected light, as the light beam scans over the body surface, such as to determine when the rate of change of the reflected light intensity reaches a maximum. It has been found that each of such maximum values corresponds to an edge formed on the body surface, to a high degree of reliability and accuracy. As in the prior art, the intensity of reflected light is measured by utilizing a photo-sensor. However since the rate of change of reflected light intensity is utilized, rather than the intensity of the reflected light, it becomes unnecessary to position the body surface under measurement very precisely with respect to the photo-sensor, and in addition the apparatus can be employed to measure edge dimensions on bodies having various types of surface configuration. Thus, a micro-dimensional measurement apparatus according to the present invention is much more practical and flexible in application than prior art types of such apparatus, and can be readily employed for in-house measurement applications in an industrial environment.

A micro-dimensional measurement apparatus according to the present invention is basically composed of a source of a light beam, such as a laser, an acousto-optical element through which the light beam passes, deflection control means for controlling the amount of deflection of the light beam produced by the acousto-optical element in accordance with the level of a deflection voltage, optical means for directing and focussing the output light beam from the acousto-optical element upon the body surface under measurement, photo-sensor means positioned to sense the intensity of reflected light from the body surface, and data processing circuit means which receives a signal from the photo-sensor indicating the intensity of the reflected light. As the light beam is scanned over the body surface by variation of the deflection voltage, the data processing circuit means successively compute differential values representing the rate of change of reflected light intensity. The peak values of these are taken as indicating the presence of edges upon the body surface. The distance between any two edges thus detected is computed by the data processing circuit means on the basis of the difference between the values of deflection voltage for the corresponding differential peak values.

It will be apparent that such a method is dependent upon the change in surface slope which defines each edge, to perform detection, rather than upon the particular shape or depth of an edge. In addition, the use of electrically controlled deflection of the light beam to scan the beam over the body surface under measurement, with the body being held fixed in position, enables a much higher degree of accuracy to be obtained than is possible with methods which utilize mechanical movement of the body under measurement.

DESCRIPTION OF THE PREFERRED EMBODIMENTS

Figure 2:
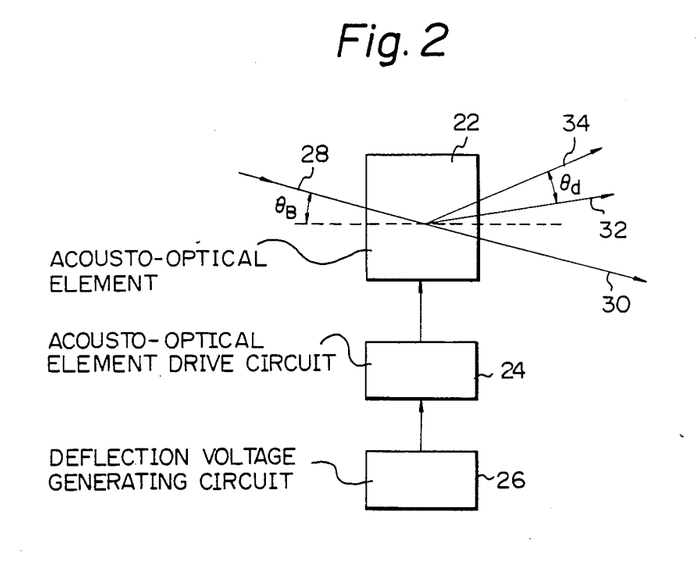
FIG. 2 is a simple block diagram to illustrate the basic principles of a system for electrically controlled deflection of a scanning light beam used in a micro-dimensional measurement apparatus according to the present invention.

FIG. 2 is a simplified block diagram to illustrate a combination of an acousto-optical element and a control system for controlling the amount of deflection of a light beam produced by the acousto-optical element, suitable for use in a micro-dimensional measurement apparatus according to the present invention. Numeral 22 denotes an acousto-optical element which basically comprises an electro-acoustic transducer and an optically transparent medium. A light beam 28, which will be assumed to be produced by a He-Ne laser, is directed to be incident on a face of acousto-optical element 22 at the Bragg angle, $\theta_B$. An acousto-optical element drive circuit 24 generates a high-frequency drive signal, at a frequency determined by the level of a deflection voltage applied thereto from a deflection voltage generating circuit 26, with this drive signal being applied to the electro-acoustic transducer within acousto-optical element 22. As a result, ultrasonic acoustic travelling waves are generated within the medium of acousto-optical element 22, which produced periodic changes in the index of refraction of that medium, which thereby functions as a form of diffraction grating for light which is incident thereon at an angle close to the Bragg angle, and so deflects the major portion of light beam 28 by an angle whose magnitude is determined by the frequency of the ultrasonic acoustic travelling waves. In this way, the emerging deflected light beam 34 from acousto-optical element 22 can be swept in a continous manner through a range of deflection angles, by variation of the output voltage from deflection voltage generating circuit 26.

Part of the incident light beam 28 passes through acousto-optical element 22 without being deflected, and is indicated by numeral 30 in FIG. 2. This undiffracted light will be ignored in the following description.

The acousto-optical element drive circuit 24 comprises a voltage-controlled oscillator (VCO), and a high-frequency power amplifier for amplifying the VCO output signal, with the output voltage from deflection voltage generating circuit 26 being applied as a frequency control voltage to the VCO.

It may be arranged, for example that when the value of deflection voltage from circuit 26 is zero, the output frequency from acousto-optical element drive circuit 24 is 90 MHz, while when the deflection voltage is raised to 1 V, the output frequency is 50 MHz. Thus, for example, the deflection of light beam 32 in FIG. 2 might result with a drive frequency of 90 MHz, i.e. with a deflection voltage level of zero, and the deflection angle of light beam 34 be produced with a drive frequency of 50 MHz applied to acousto-optical element 22, i.e. with a deflection voltage level of 1 V from deflection voltage generating circuit 26. In this case, the value of the difference $\theta_D$ between the deflection angles of light beams 32 and 34 is given as follows:

$$\theta_D = \lambda \cdot f_s / v_a$$

Here, $\lambda$ is the wavelength of the laser light beam 28, $f_s$ is the change in frequency of the ultrasonic acoustic travelling waves produced by acousto-optical element drive circuit 24 to bring about the change in deflection angle $\theta_D$. In the example above, this would be $(90-50)=40$ MHz. $V_a$ is the speed of travel of sound within the medium of acousto-optical element 22.

Figure 3:
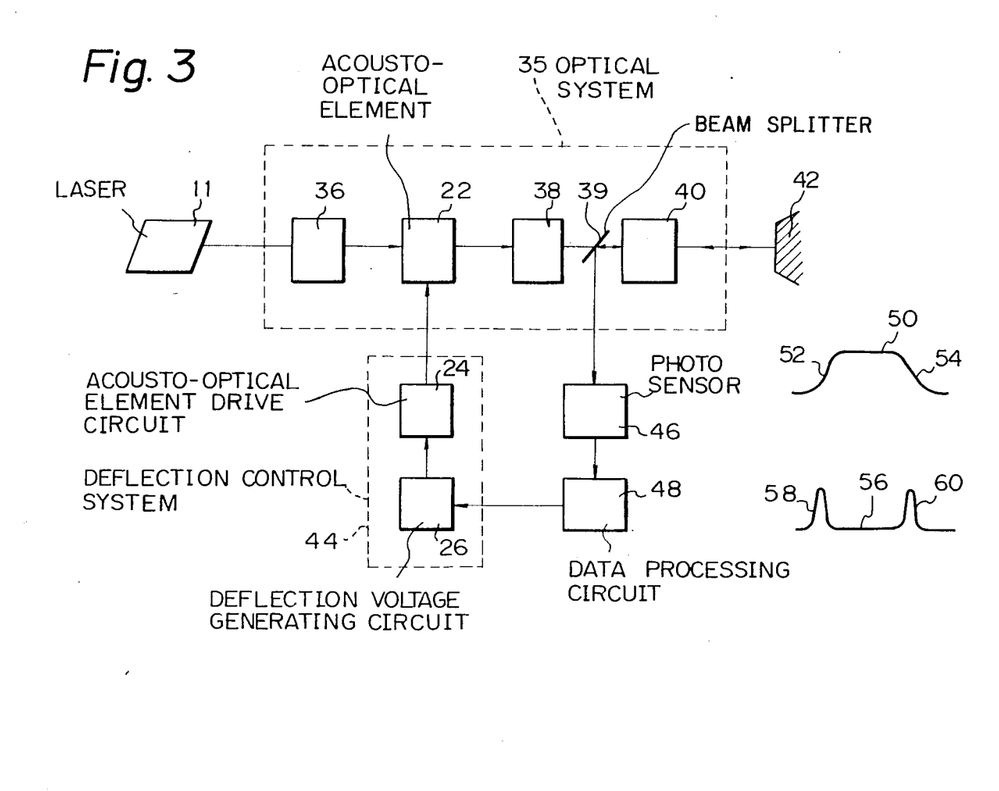
FIG. 3 is a block diagram of an embodiment of a micro-dimensional measurement apparatus according to the present invention.

FIG. 3 shows a simple block diagram of an embodiment of a micro-dimensional measurement apparatus according to the present invention. Reference numeral 11 denotes a laser unit, employing for example a He-Ne laser. The output light beam from this laser enters an optical system 35, incorporating the acousto-optical element 22 described above, which acts to focus the laser light beam as a small-diameter spot upon the surface of body 42 which is to be measured, and to scan the light beam across the body surface under the control of drive signals from a deflection control system 44 applied to acousto-optical element 22. Optical system 35 further comprises a first group of optical elements 36, which act to convert the beam shape (i.e. as seen in cross-section) of the output light beam from laser unit 11 to a suitable shape for interacting with the refracting medium of acousto-optical element 22. The emerging light beam from acousto-optical element 22 enters a second group of optical elements 38, which restores the original beam shape of the laser light beam, and the output light beam from acousto-optical element 22 is passed through a third group of optical elements 40, which act to focus the laser light beam to form a spot of minute diameter upon the body surface 42 to be measured. An beam splitter 39 serves to transmit the light beam from second group of optical elements 38 to third group of optical elements 40, while directing the reflected light from body surface 42 towards a photo-sensor 46. The deflection provided by acousto-optical element 22 is controlled by a deflection control system 44, comprising a deflection voltage generating circuit 26 and acousto-optical element drive circuit 24 as described hereinabove.

As stated above, deflection of the light beam, and hence scanning of the light beam across body surface 42, is performed in accordance with changes in the level of a deflection voltage produced by deflection voltage generating circuit 26. Such changes in the deflection voltage can be produced by applying suitable input signals to deflection voltage generating circuit 26, e.g. signals commanding deflection voltage generating circuit 26 to produce a deflection voltage varying as a linearly increasing ramp waveform voltage. Means for commanding the operation of deflection voltage generating circuit 26 in this way, to thereby determine the rate of scanning of the light beam across body surface 42, will be broadly referred to in the following description and the appended claims as deflection control circuit means. In the present embodiment, this function is performed by a data processing circuit 48, i.e. successively varying digital or analog type signals applied from data processing circuit 48 to deflection voltage generating circuit 26 serve to determine the output voltage level produced from deflection voltage generating circuit 26 and hence the amount of deflection produced by acousto-optical element 22. However various other arrangements can be envisaged, so long as data representing the successive values of deflection voltage level from deflection voltage generating circuit 26 is made available to to data processing circuit 48 for use in computing distances between surface edges, as described hereinafter.

Photo-sensor 46 produces a signal which varies in accordance with the intensity of reflected light from body surface 42, and this signal is input to a data processing circuit 48 to be processed thereby. The form of variation of the reflected light intensity is illustrated by numeral 50, and as shown the reflected light intensity varies most rapidly when the light beam scans across an edge portion of body surface 42, e.g. as indicated by numerals 52 and 54. Data processing circut 48 successively produces differential values of the output signal from photo-sensor 46, with these values reaching peaks of magnitude when the light beam scans over an edge portion of body surface 42, e.g. as indicated by numerals 58, 60. More specifically, it is arranged in this embodiment that the reflected light intensity is a maximum when the light beam scans across a plane portion of body surface 42 which is disposed perpendicular to the direction of incidence of the beam, and a minimum when the light beam falls upon an edge face which is oriented substantially perpendicular to such a plane portion.

It is important to note that such differential peak values provide a very precise indication of edge position, since they correspond to movement of the scanning light beam (which is focussed by third group of optical elements 40 to a spot of light only a few micrometers in diameter upon the body surface 42) across the junction of two surface faces of sharply differing slope, i.e. a corner. Thus the actual difference in slope between these faces, forming an edge, will have only a limited effect upon the accuracy of sensing the edge position. As stated above, only peak values of the rate of change of the reflected light intensity are computed by data processing circuit 48, with the computation being substantially independent of variations in the absolute intensity of the reflected light.

If it is assumed that there is a precisely proportional relationship between changes in the level of deflection voltage produced by deflection voltage generating circuit 26 and corresponding movement of the light beam over body surface 42, then the distance between any two edges, as indicated by peak differential values as described above, will be computed directly by data processing circuit 48 from the difference between the deflection voltage levels at which these peak values occurred. In practice the relationship between deflection voltage and scanning distance will not be linearly proportional over the entire scanning range. However this problem can be readily overcome by scanning the light beam over a body surface having precisely known edge distances thereon, to thereby determine compensation values needed to perform correction of subsequent distance computations by data processing circuit 48. Such compensation values can be stored in data processing circuit 48 and used thereafter each time an edge distance computation is performed, to thereby perform accurate measurement.

Figure 4A:
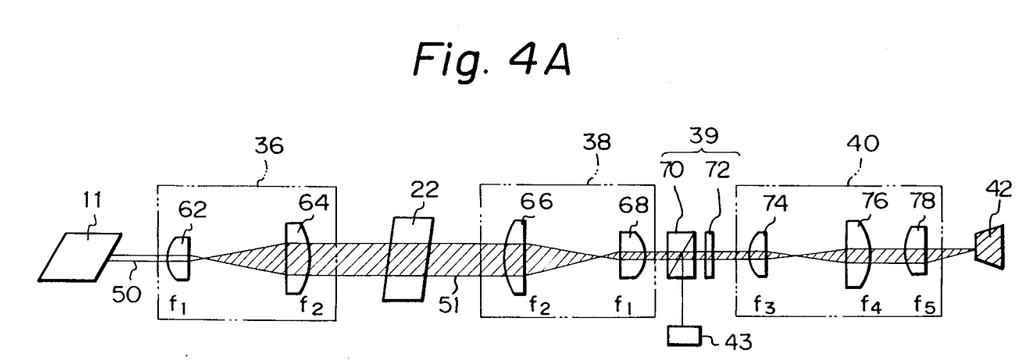
FIGS. 4A and 4B are diagrams illustrating an optical system used in the embodiment of FIG. 3.

FIG. 4A is a view illustrating the optical system 35 in the embodiment of FIG. 3, as seen perpendicular to the light beam axis and to the direction of maximum beam width, for the condition in which the light beam is deflected to an angle at the center of the deflection range. First group of optical elements 36 comprises a cylindrical lens 62 having focal length $f_1$ and a plano-convex lens 64 having focal length $f_2$. These convert the circular cross-section beam 50 from laser unit 11 to a beam having a flattened elliptical cross-section, with the ratio of the major dimension to the minor dimension of the beam cross-section being equal to $f_2/f_1$.

Designating the diameter of laser output beam 50 as $D_0$, the size of the major dimension of the beam cross-section upon output from lens 64 is equal to $D_0 \cdot f_2/f_1$.

This expansion of the beam width of the light beam is performed in order to increase the duration of mutual interaction between the light beam and the ultrasonic acoustic travelling waves within acousto-optical element 22, to thereby maximize the deflection efficiency of acousto-optical element 22. That is to say, the beam is converted to have a flattened elliptical cross-section, with the major dimension thereof being aligned parallel to the direction of advancement of the ultrasonic acoustic travelling waves.

The output light beam from acousto-optical element 22 is then modified by passing through second group of optical elements 38, which comprises a plano-convex lens 66 of focal length $f_2$ and a cylindrical lens 68 of focal length $f_1$. This symmetrical arrangement of the focal lengths of lenses 62 to 68 results in a light beam having a circular cross-section being output from second group of optical elements 38, and this is passed through an optical isolator 39 made up of a polarizing beam splitter 70 and a ¼ wavelength plate 72. These serve to rotate the plane of polarization of the light beam from lens 68 by circular polarization, and the resultant light beam then passes through third group of optical elements 40. This comprises a plano-convex lens 74 of focal length $f_3$, a plano-convex lens 76 of focal length $f_4$, and an object lens 78 having focal length $f_5$. The beam diameter is first increased, in the proportion $f_4/f_3$, to become equal to $D_0 \cdot f_4/f_3$. This light beam is then focussed by object lens 78, to produce a light spot having a very small diameter when incident upon body surface 42. By suitable selection of the focal lengths of lenses 74, 76 and 78, it is possible to produce a light spot having a diameter of only a few micronmeters.

With such an optical system, the relationship between a change in angle of deflection of the light beam by acousto-optical element 22, designated as $\theta_D$, will produce a corresponding change in position of the light spot incident on body surface 42 of magnitude D, with the relationship between $\theta_D$ and D being as follows:

$$D = f_2 \cdot f_3 \cdot f_5 \cdot \theta_D / (f_1 \cdot f_4)$$

The change in level of deflection voltage output from deflection voltage generating circuit 26 which produces such a magnitude of scanning displacement D will be designated as $V_0$. Then, defining the distance between a pair of edges formed upon a surface under measurement as S (e.g. the distance between the edges which result in differential peak values 58 and 60 shown in FIG. 3), and designating the difference in deflection voltage levels between the point of generation of the first differential peak value and the second differential peak value as V, the following relationship is true:

$$S = D \cdot V / V_0$$

This computation is performed by data processing circuit 48 to measure the distance between two edges.

Figure 4B:
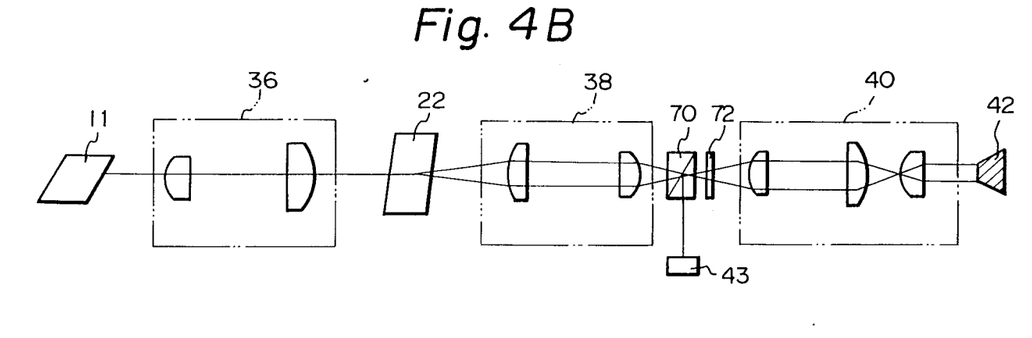

FIG. 4B shows the path traced out by the central axis of the light beam as the beam is deflected to scan across two edges of body surface 42, by the action of acousto-optical element 22.

The reflected light from body surface 42 passes back through third group of optical elements 40, is again subjected to rotation of the plane of polarization by ¼ wavelength plate 72, and hence is reflected by beam splitter 70 to be incident upon photo-sensor 43.

In the above embodiment, coherent light from a laser source is utilized to form the scanning light beam. However it should be noted that this is not an esssential feature of the present invention, and that it is possible to use non-coherent unpolarized light. In such a case it would of course be necessary to utilize a different optical isolator arrangement, to separate the paths of the scanning light beam and reflected light, e.g. to use a non-polarizing beam splitter without employing a ¼ wavelength plate.

Figure 5A:
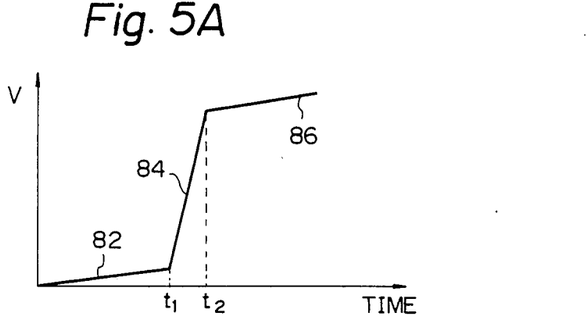
FIGS. 5A and 5B are waveform diagrams illustrating methods of varying a deflection voltage of the embodiment of FIG. 3 such as to minimize the scanning time required for dimensional measurement.

Assuming that various sources of measurement error have been eliminated (e.g. by deriving compensation values beforehand, to be stored and used for compensation of dimension computations, as described hereinabove), the basic limitation upon the precision of measurement by the apparatus is set by the resolution attainable for variation of the deflection voltage produced by deflection voltage generating circuit 26 and by the diameter of the light beam at incidence upon the body surface under measurement. The deflection voltage can be varied in a continous manner, to scan the light beam continuously across the body surface under measurement, or can be varied in successive step increments, to thereby step the light beam across the body surface. The resolution of variation of the deflection voltage will be increased as the rate of variation (with respect to time) is lowered, while the resolution will decrease as the rate of variation is increased. Thus, a choice must be made between performing measurement by rapidly scanning the light beam over the surface under measurement, with relatively low measurement accuracy, or scanning the light beam slowly across the surface, with a higher degree of measurement accuracy. One method of overcoming this problem is to perform a preliminary measurement to determine the approximate positions of edges upon the body surface concerned, and to memorize these positions, e.g. by data processing circuit 48. Precision measurement can then be performed by scanning the light beam over the body surface at a relatively slow speed in the vicinity of each edge portion on the surface, and to scan the light beam across the surface at a relatively high speed in the plane portions of the surface between the edges to be measured. In the case of continuously varying scanning, this can be accomplished by making the waveform of the deflection voltage from deflection voltage generating circuit 26 have the general form shown in FIG. 5A. Here, the deflection voltage is made to vary relatively slowly, as indicated by numeral 82, as the light beam scans across a portion of the body surface under measurement in which an edge is known to be located. Thereafter, the deflection voltage is made to increase rapidly, as indicated by numeral 84, to sweep the scanning light beam across a portion of the body surface in which now edges are located, so that scanning of this plane portion of the surface is completed in the time interval from $t_1$ to $t_2$. The deflection voltage is then increased once more at a slow rate, as indicated by numeral 86, to scan the light beam across a portion of the body surface in which a second edge is known to be located.

Figure 5B:
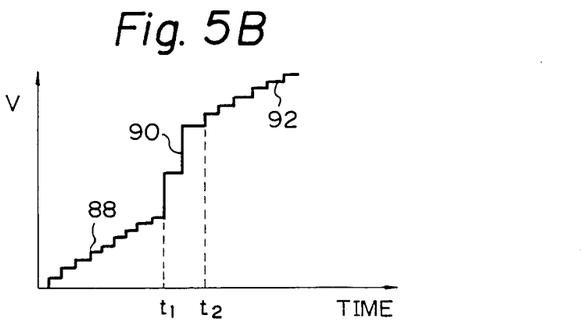

FIG. 5B shows how the deflection voltage can be similarly varied in a stepwise manner, to accomplish the objective described above. In this case, step increments of deflection voltage, as indicated by numerals 88, 92, are employed to scan the light beam across portions of the body surface under measurement in which edges are known to be located, while large amplitude step increments of the deflection voltage, as indicated by numeral 90, are employed to sweep the scanning beam rapidly across each portion of the body surface which is known to be flat.

Figure 6:
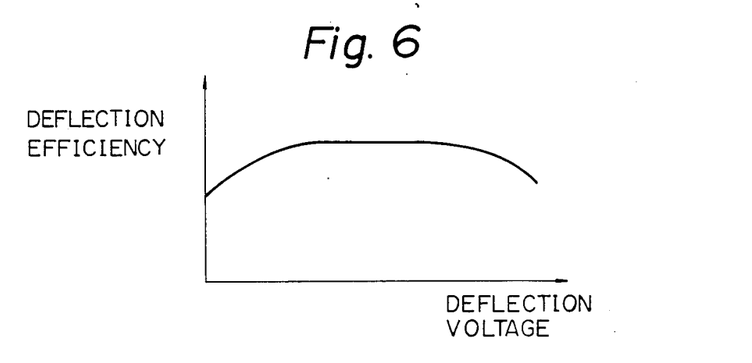
FIG. 6 is a graph illustrating the relationship between deflection efficiency and deflection voltage for an acousto-optical element used in the embodiment of FIG. 3.

As stated above, the relationship between the deflection voltage produced by deflection voltage generating circuit 26 and the movement of the focussed light beam spot across the body surface under measurement is not accurately linear, although compensation for this can be applied as discussed above. A major reason for this is illustrated in FIG. 6, which is a graph showing the relationship between the deflection voltage applied to acousto-optical element drive circuit 24 and the resultant deflection efficiency of acousto-optical element 22. As shown, this is a linear relationship at the mid-portion of the scanning range, and departs increasingly from linearity at the edges of the range.

Figure 7A:
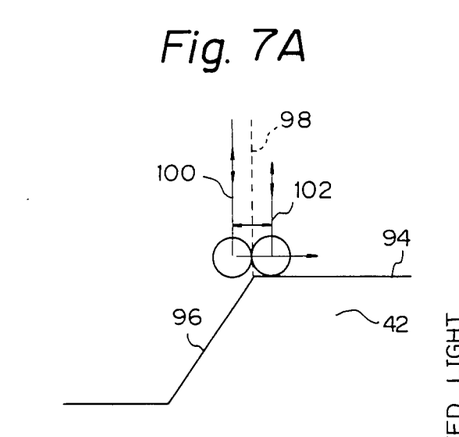
FIGS. 7A to 7D illustrate a modification of the embodiment of FIG. 3 whereby the relationship between reflected light intensity and deflection voltage applied to control deflection of a scanning light beam is approximated to a mathematical function.
Figure 7B:
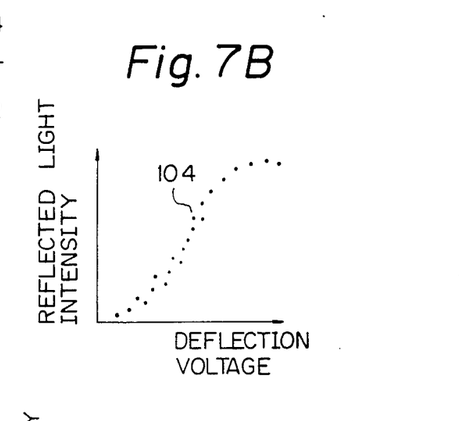

In addition, as stated above, one of the basic factors limiting the attainable measurement accuracy and resolution is the diameter of the scanning light beam at incidence upon the body surface under measurement. This is illustrated in FIG. 7A. As shown, the minimum measurement distance is equal to the light beam diameter, i.e. the distance travelled as the light beam moves from the position indicated by numeral 100 to that indicated by numeral 102. Here it is assumed that an edge, at position 98, is formed between a plane portion 94 and sloping portion 96 of the surface of a body 42, with edge position 98 being disposed midway between scanning beam positions 100, 102. As the light beam moves in the directon indicated by the arrow, from position 100, past edge position 98, to position 102, the reflected light intensity will increase from a minimum to reach a maximum, when the beam becomes incident upon upper plane surface portion 94. However in actual fact, the detected reflected light intensity signal from photo-sensor 46 in the embodiment of FIG. 3 will not vary smoothly, but will be disturbed by the presence of dust and scratches upon the body surface, and by the effects of external vibration etc. This is illustrated in the graph of FIG. 7B, which shows the detected reflected light intensity (plotted along the vertical axis) with respect to the variation of deflection voltage (plotted along the horizontal axis, assuming that increasing deflection voltage values result in rightward movement of the scanning light beam as viewed in FIG. 7A), for movement of the light beam from positions 100 to 102 shown in FIG. 5A. As can be seen, the resultant relationship displays the effects of extraneous factors as described above, and does not vary in a smooth manner, so that it is difficult to accurately determine the precise value of deflection voltage at which the rate of change of reflected light intensity is a maximum in order to determine the edge position 98.

This problem can be overcome by employing a predetermined continuously varying mathematical function which is known to vary in a similar manner to the relationship 104 shown in FIG. 7B, i.e. with one variable of the function representing deflection voltage and another representing reflected light intensity. The data processing circuit 48 first detects when a consecutively measured set of reflected light intensity values approximately match this predetermined mathematical function, then determines the oint of maximum rate of change of the function. This point corresponds to an edge position, with the effects of surface roughness, etc., being effectively eliminated.

The variation of reflected light intensity shown in FIG. 7B has basically Gaussian distribution, and it has been found from experiment that such a function can be represented approximately by a third-order or fourth-order polynomial having the general form:

$$y = \sum_{i=0}^{m} a_i \cdot x^i$$

i.e. a function of the form:

$$y = a_0 + a_1 \cdot x + a_2 \cdot x^2 + a_3 \cdot x^3$$

The maximum rate of change of such a function is obtained by differentiating, to obtain:

$$y^1 = a_1 + 2a_2 \cdot x + 3a_3 \cdot x^2$$

Where y corresponds to reflected light intensity and x corresponds to deflection voltage.

Figure 7C:
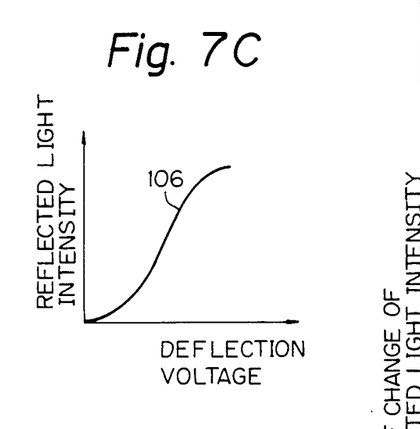
Figure 7D:
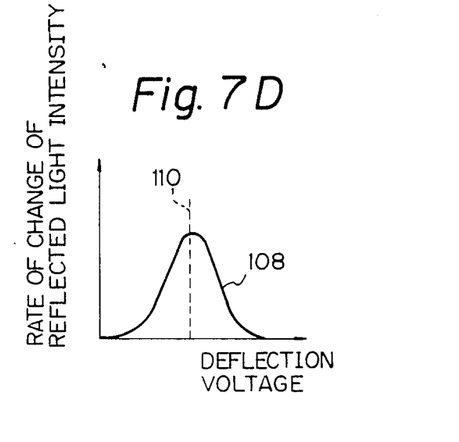

Such a polynomial function, which approximates to the set of reflected light intensity data values shown in FIG. 7B, is shown graphically by curve 106 in FIG. 7C, and the result of differentiating this is shown as curve 108 in FIG. 7D. Here, the maximum value of rate of change of reflected light intensity is obtained as the peak of the function obtained by differentiation, i.e. the value of x and hence of deflection voltage at which this maximum occurs (indicating the position of an edge) is as indicated by numeral 110.

Such derivation of a mathematical function such as a chebysher function approximating to the relationship between deflection voltage and reflected light intensity at each of the edges on the body surface under measurement can be readily accomplished by modern data-processing facilities, i.e. data processing circuit 48 can consist of a suitably programmed microprocessor to a so-called method of least squares. The function derived can be modified to incorporate correction data derived beforehand, as described hereinabove, to compensate for non-linearity of the relationship between light beam scanning and the deflection voltage.

Although the embodiments described above are based upon the detection of reflected light from the body surface under measurement, it is equally possible to utilize detection of transmitted light, for certain types of body material.

From the above description, it will be apparent that a micro-dimensional measurement apparatus according to the present invention can have a simple and readily manufactured configuration, yet enables measurement of minute distances between edges on a surface to a very high degree of accuracy. In addition, due to the detection process being based upon variations in the rate of change of reflected light intensity as a scanning beams sweeps across the body surface under measurement, rather than absolute values of reflected light intensity, such an apparatus has very much greater flexibility then prior art apparatus of this type, with regard to positioning relationships between the apparatus and the body under measurement. This flexibility ensures that a micro-dimensional measurement apparatus according to the present invention can be readily utilized in a practical manufacturing environment. In addition, use of electro-optical scanning means for moving the scanning light beam over the body surface under measurement eliminates the measurement inaccuracies which arise with prior art apparatus due to mechanical movement of the body under measurement with respect to fixed light beam.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A micro-dimensional measurement apparatus for measuring the distance between at least two edges formed upon a surface of an object, comprising:
   an acousto-optical element;
   acousto-optical element drive means for generating ultrasonic acousitc travelling waves within said acousto-optical element;
   deflection voltage generally circuit means coupled to said acousto-optical element drive means for applying a deflection voltage thereto such that the level of said deflection voltage determines the frequency of said ultrasonic acoustic travelling waves;
   a laser source for generating a light beam, and first optical element means for shaping and directing said light beam to pass through said acousto-optical element and be thereby deflected by an angle which is determined by the frequency of said ultrasonic acoustic travelling waves;
   second optical element means disposed to modify the shape of said light beam emerging from said acousto-optical element;
   third optical element means disposed to direct said light beam emerging from said second optical eleemnt means onto said body surface and to focus said light beam to form a light spot on said body surface;
   photo-sensor means disposed to receive reflected light from said body surface resulting from said light beam impinging thereon, for producing a signal varying in accordance with the intensity of said reflected light;
   deflection control circuit means for controlling said deflection voltage generating circuit means such as to vary the level of said deflection voltage at a predetermined rate to thereby correspondingly vary the frequency of said ultrasonic acoustic travelling waves and so vary said angle of deflection of said light beam to thereby scan said light beam across said body surface at a corresponding speed, and comprising means for storing approximate positions of said edges prior to precise measurement by said micro-dimensional measurement apparatus, said deflection control circuit means operating during said precise measurement in accordance with said approximate edge positions to vary the rate of change of said deflection voltage with respect to time relatively slowly while said light beam is scanning across said body surface in the vicinity of each of said approximate edge positions and to vary said rate of change of deflection voltage relatively rapidly while said light beam is scanning across portions of said body surface substantially distant from said approximate edge positions, and;

data processing circuit means comprising means for detecting when the relationship between consecutively mesured values of said reflected light intensity and corresponding values of said deflection voltage approximately match a predetermined mathematical function, and for differentiating said function to detect a condition of maximum rate of change of said reflected light intensity, for thereby measuring the distance between said at least two edges as represented by a difference between two values of said deflection voltage which correspond respectively to two of said conditions of maximum rate of change of relfected light intensity.

2. A micro-dimensional measurement apparatus according to claim 1, in which said data processing circuit means incorporates said deflection control circuit means.

3. A micro-dimensional measuremnet apparatus according to claim 1 in which said mathematical function is a polynomial function.

4. A micro-dimensional measurement apparatus according to claim 1, in which said deflection control circuit means controls said deflection voltage to vary in successive steps of relatively small magnitude while said light beam is scanning across said body surface in the vicinity of each of said edges and in successive steps of relatively large magnitude while said light beam is scanning across portions of said body surface distant from said edge positions.

5. A micro-dimensional mesurement apparatus according to claim 1, wherein said data processing means further comprises means for storing compensation data corresponding to deviations from linearity of a relationship between variation of said deflection voltage and resultant distance travelled by said light spot along said object surface, and for correcting said measured distance in accordance with said stored compensation values.

* * * * *